May 11, 1954 C. A. ELLIS 2,678,159
CENTRIFUGAL SEPARATING AND STORING APPARATUS FOR BLOOD
Filed June 30, 1951 5 Sheets-Sheet 1

INVENTOR
CHARLES A. ELLIS
BY
ATTORNEYS

May 11, 1954 — C. A. ELLIS — 2,678,159
CENTRIFUGAL SEPARATING AND STORING APPARATUS FOR BLOOD
Filed June 30, 1951 — 5 Sheets-Sheet 2

INVENTOR
CHARLES A. ELLIS
BY
ATTORNEYS

May 11, 1954  C. A. ELLIS  2,678,159
CENTRIFUGAL SEPARATING AND STORING APPARATUS FOR BLOOD
Filed June 30, 1951  5 Sheets-Sheet 3

INVENTOR
CHARLES A. ELLIS
BY
ATTORNEYS

May 11, 1954  C. A. ELLIS  2,678,159
CENTRIFUGAL SEPARATING AND STORING APPARATUS FOR BLOOD
Filed June 30, 1951  5 Sheets-Sheet 5

INVENTOR
CHARLES A. ELLIS
BY
ATTORNEYS

Patented May 11, 1954

2,678,159

UNITED STATES PATENT OFFICE 2,678,159

CENTRIFUGAL SEPARATING AND STORING APPARATUS FOR BLOOD

Charles A. Ellis, Southbridge, Mass., assignor to American Optical Company, Southbridge, Mass., a voluntary association of Massachusetts Application June 30, 1951, Serial No. 234,615

14 Claims. (Cl. 233—2)

This invention relates to surgical apparatus and more particularly to apparatus for collecting, separating and storing various types of solutions in a completely sterile condition. The invention while of general utility for the handling of various parenteral solutions and the like under sterile conditions is particularly useful for the extraction, separation and storage of blood in the form of its several blood components.

While the apparatus of the present invention has general utility for dealing with a plurality of different types of parenteral and medicated solutions, it is particularly useful for the treatment of human blood. For example, it has become exceedingly important at the present in caring for sick and injured persons to use whole blood and blood components for surgical and other medicinal purposes. On the other hand it must be borne in mind that human blood is a highly complex material embodying living cells and subject to deterioration as well as sensitive to misuse and the like. Accordingly, it is highly desirable to be able to extract blood from the person, to be able to condition the blood and to separate the blood into its various desirous components or combinations while maintaining same in a completely sterile condition.

While human blood is a very complex material and, accordingly, hard to deal with, it has been found, nevertheless, that good whole blood and blood components, when properly utilized, have a great many useful and diversified functions. In fact, the medical and surgical professions have become most dependent upon its use. It has been found that not only is whole blood useful when properly handled for blood transfusions, when used within a rather limited time after extraction, but also that when the blood is separated into usable components such as blood plasma, or as concentrated blood cells in plasma or as blood cells dispersed in saline solutions, these materials may have a variety of special applications and also their useful life may be altered and often materially extended.

In the present invention, apparatus is provided whereby whole blood may be extracted from a person, immediately passed through a decalcification chamber and then through a cooling chamber to reduce the temperature thereof from normal body temperature to a near freezing condition for reducing the enzyme action thereof. It may then be passed into a centrifugal separator where by the use of varying amounts of centrifugal force and by the use of different wash solutions, the blood may be separated into various component parts and collected in different storage containers either manually or automatically and while maintaining the blood specimen in a completely sterile and hermetically sealed-in condition. Also by the use of a neat and compactly arranged construction of the several parts constituting the apparatus for performing the desired separation and collection, the apparatus may be made in the form of a compact unit which is readily transportable and thus may be utilized either at the bedside of a patient in a conventional hospital, used in a field hospital, or used at any other suitable location at which the need arises.

It is, accordingly, an object of the present invention to provide apparatus for extracting, conditioning, separating and storing parenteral liquids and the like, such as blood components under sterile conditions.

It is a further object of the invention to provide such apparatus which is of compact, inexpensive and of portable construction, but still capable of properly separating and storing blood components or the like in separate receptacles for later use.

It is an additional object of the invention to provide apparatus for separating plasma or a secondary plasma from the red corpuscles and other materials in the blood and collecting said plasma, etc. in a separate closed container immediately after extraction of the blood and while maintaining same under completely sealed-in and sanitary condition.

An additional object of the present invention is the provision of interchangeable completely hermetically sealed sub-assemblies for selective use in the apparatus and which may be readily added to the apparatus for the collection and separation of the blood components of each individual donor and which thereafter may be readily removed from the apparatus for transportation to other desired locations while maintaining the contents within the containers in a sealed-in and sterile condition.

An additional object of the invention is to provide simple and novel interchangeable conditioning apparatus comprising a resin containing blood conditioning chamber and a heat exchanger for reducing the temperature of an individual donation of blood and during the donation thereof to a desired low temperature and with said apparatus being adapted to be replaced by another subsequent to each donation.

It is a further object of the present invention to provide simple, efficient and novel high speed dynamically balanced centrifugal means for use in the separation of blood components, said centrifugal means being a part of the sub-assembly which is readily removable from the apparatus for the transportation to other locations after the centrifugal separation action thereof has been performed.

It is an additional object of the invention to provide a source of pressure in conjunction with a plurality of separate closed containers, valve means and interconnecting conduits connecting same with a centrifugal separator in such a manner that the contents of a selected container may be returned to the separator for additional processing whereby selected portions thereof may be returned to the same container or to other selected containers as desired.

It is an additional object of the present invention to provide in an apparatus of the above character a simple and novel cooling system whereby blood donations may be initially cooled and subsequent processing of the donations carried out at a reduced temperature, said reduced temperature being maintained over a period of time in the individual containers in which such component parts are placed if such is necessary.

It is an additional object of the present invention to provide automatically operable means for effecting a complete operating cycle wherein a standard donation of whole blood may be initially conditioned and cooled and thereafter centrifugally processed to extract therefrom and collect in separate individual containers the separate components of the blood or various combinations of components thereof while maintaining these components in a completely sterile condition and while maintaining the collected materials at a controlled temperature.

Other objects and advantages of the invention will become apparent from the detailed description which follows when taken in conjunction with the accompanying drawing in which.

Figure 1:
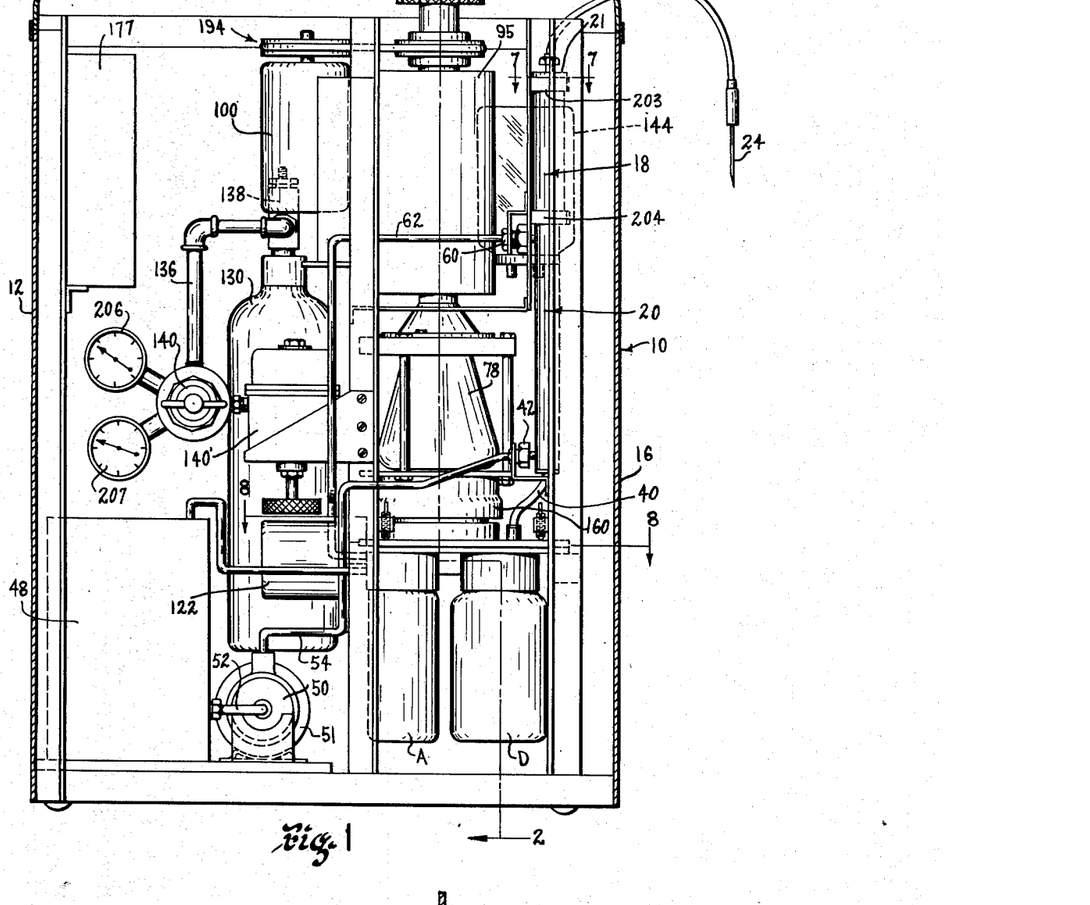
Fig. 1 is a side elevational view of the apparatus embodying the present invention, certain enclosing parts thereof being removed and other parts broken away or shown in section to better disclose details of construction.
Figures 2, 5, 9, 10, 11:
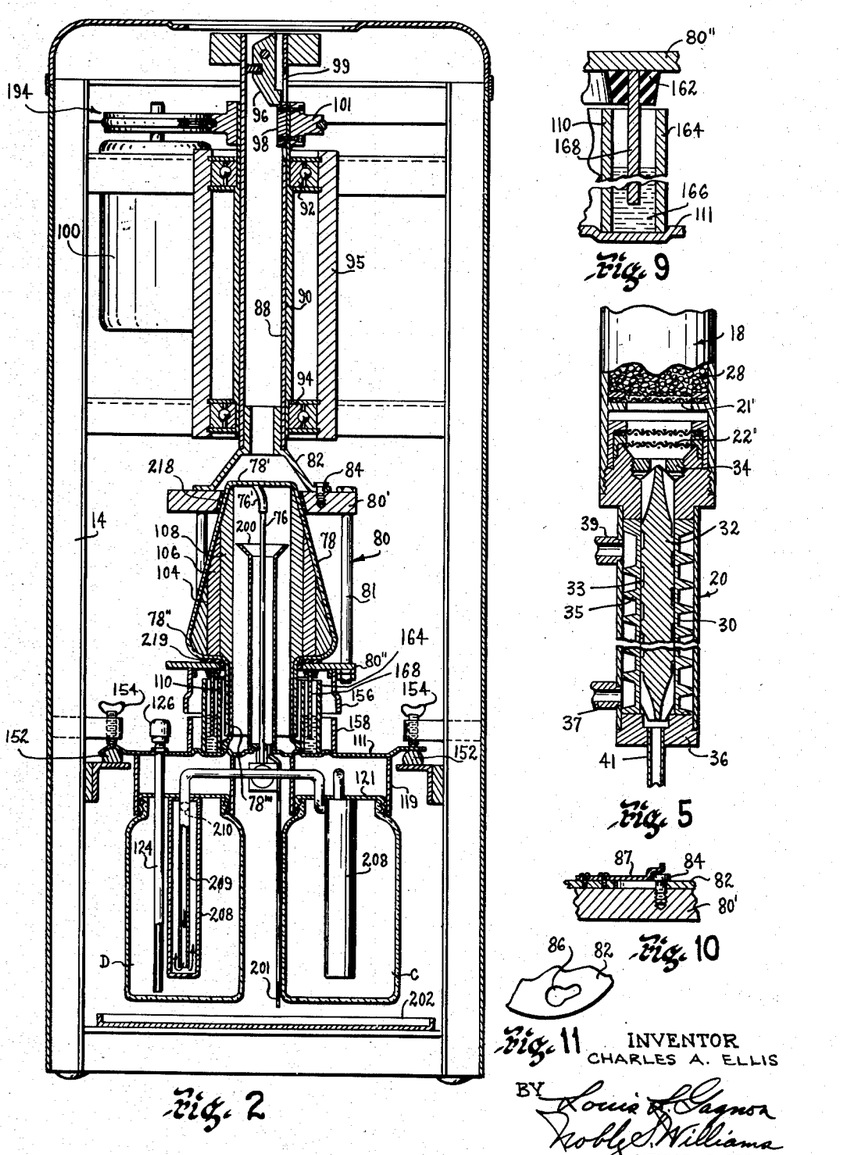
Fig. 2 is a sectional view taken substantially on line 2—2 of Fig. 1.
Fig. 5 is an enlarged fragmentary view of a portion of the structure shown in Fig. 4 and with parts thereof broken away and other parts thereof shown in section.
Fig. 9 is an enlarged fragmentary view of a portion of the structure shown by Fig. 2.
Figs. 10 and 11 are fragmentary sectional and plane views respectively of attaching means employed in the apparatus of Fig. 2.

Referring to the drawings in detail and particularly Figs. 1 and 2, it will be seen that the numeral 10 indicates generally a readily portable self contained collecting, separating and storage apparatus which may be used advantageously for the classification and storage of various types of parenteral fluids and the like under completely sterile conditions. While the apparatus is useful for the separating and collecting of such fluids it will first be described in detail in conjunction with the treatment of blood. This apparatus is shown in the form of a completely enclosed cabinet having exterior walls 12 supported by an open framework 14 and with a hinged closure member 16 providing access to the interior of the cabinet. Within the cabinet and convenient so as to be reached through the open front thereof is a decalcification chamber 18 to which is removably secured a coolant chamber 20. These two chambers are arranged to be removed from the rest of the apparatus as a separate unit for reasons to be presently described. To the upper end 21 of this removable unit is secured a flexible treated rubber or plastic tube 22 carrying a hollow needle 24 at its free end for extracting blood from a donor. As will be readily understood, the needle 24 when supplied for use with the combined unit 21 will be completely encased and protected from contamination by an outer removable cap 26 (see Fig. 4). Other openings may be provided in walls 12.

The decalcification chamber 18 may be provided with suitable granular resinous material 28 of known form for extracting from the blood filtering therethrough calcium and platelets after which the blood passes into and through the coolant chamber 20. If reference is made to Fig. 5, it will be seen that this chamber contains centrally therein a tubular wall 30 extending from end to end of the chamber and within this wall is concentrically secured a core 32 having a helical groove 33 adjacent the wall 30 so that a fairly thin elongated passage will be provided for the travel of the blood assuring thereby that all parts of the blood will be subjected to the cooling action of the tubular wall 30 as same passes through the chamber 20. The tubular wall 30 has formed upon its outer surface spiral heat transferring fins 35 located intermediate the tubular wall 30 and the outer housing of the chamber 20 so that coolant can pass from an entrant port 37 to and through an outlet port 39. The core 32, it will be noted, is pointed at each end and each pointed end portion fluted thereby providing ready access for the blood to the spiral groove 33 and at the same time this core will be accurately held in concentric relation by the central apertured supporting discs 34 and 36 the latter forming the end wall for chamber 20. Secured to the lower member 36 is a stem 41 for receiving a second flexible tubing 40 (see Fig. 1) for conducting the cooled decalcified blood to the apparatus to be presently described. Filters of known construction may be employed as indicated at 21' and 22' between the chambers 18 and 20 for supporting the granular resinous material and for completely filtering all blood entering the coolant chamber.

A preferred coolant for use with the apparatus of the present invention may be in the form of iced water contained in a storage tank 48 having a well-insulated wall surrounding same and to this storage tank is connected by means of tubing 52 a centrificial pump 50 which may be driven by a universal motor 51 and the opposite side of said pump is connected by an additional conduit 54 to the connector 42 of special construction (see Fig. 6), such that a proper cooling of the blood passing through the coolant chamber 20 will be produced from a body temperature of approximately 37° C. to near 0° C. The reason for such cooling of the blood is to reduce the enzyme action which would otherwise take place and rapidly deteriorate the quality thereof.

Figure 6:
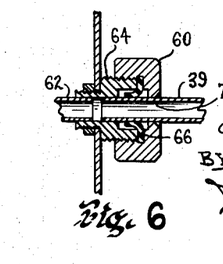
Fig. 6 is a sectional view of a coupling which may be employed for attaching the conditioning unit of Fig. 4 to the apparatus shown in Fig. 1.

The coupling 42 is of a special construction shown in Fig. 6, as is likewise a coupling 60 for connecting the opposite end of the chamber 20 to the exhaust conduit 62 for the coolant. These couplings 42 and 60 allow the connectors or stems 37 and 39 carried by the coolant chamber to be readily attached to the inlet and exhaust conduits 54 and 62 respectively in a leak-proof manner without requiring the operator of the instrument to screw, connect or otherwise manipulate same except for the insertion of the stems into the coupling by pressing thereon. Each coupling embodies an outer casing portion 64 to which the conduit 62 is attached and adjacent the opposite side thereof is carried a flexible diaphragm 66 having an undersized opening centrally therein. The diaphragm 66 is held in place by an apertured cap 68 screw threaded onto part 64 and is provided with a central opening 70 of sufficient size to admit the stems 37 or 39.

Figure 8:
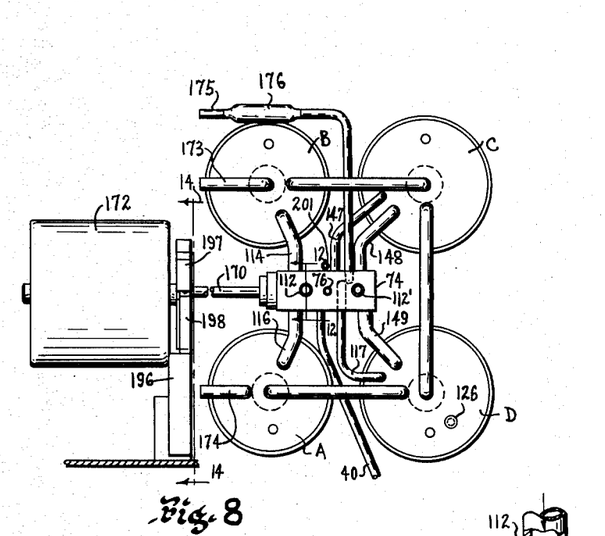
Fig. 8 is a fragmentary view of structure shown in Fig. 1 and taken substantially upon section line 8—8 thereof.

A flexible tubing 40 (see Figs. 1, 4 and 8) is used for transferring the cooled blood from the chamber 20 to a control valve 72 of special construction. The control valve in the present instance is of a rotary type enclosed within an outer casing or housing 74 and is provided with suitable peripheral passages for interconnecting ports in the valve casing to other parts of the apparatus in a manner which will be presently described in greater detail. The blood entering the valve 72 through conduit 40, when the valve is in its initial position, flows to a tubular riser 76 extending upwardly centrally within a centrifugal chamber or receptacle 78 and at its upper end 76' this riser is curved slightly and tapered so as to fit closely adjacent the upper wall 78' of this receptacle. The receptacle 78, during operation of the apparatus, will be supported by a cradle 80 formed by upper and lower apertured plates 80' and 80'' interconnected by bolts 81. The cradle surrounds the receptacle and is in turn detachably connected to a rotatable bell shaped supporting head 82 by suitable means such as bayonet connections formed by upstanding pins 84 (see Figs. 10 and 11) carried by the cradle 80' and key hole slotted openings 86 formed in the head 82. Three or four of these slot and pin connections are preferred concentric with the vertical axis of rotation of the receptacle 78 and at least one pin is provided with spring catch 87 for preventing undesired disengagement of the pins and slots. However, by lifting the free end of the spring catch the associated pin may be easily separated from its key hole slot.

When the cradle 80 and head 82 are connected they may be elevated and supported by an elongated tubular carrying member 88 which extends upwardly through an outer tubular bearing supported member 90 with which it has slidable engagement and which is in turn supported for high speed rotation by a pair of anti-friction bearings 92 and 94 carried by supporting sleeve 95 on the main framework 14. Limited sliding movement between these tubular members 88 and 90 is provided for raising the head 82 away from cradle 80. However, when the head 82 is in its upper position a releasable spring loaded latch 96 carried by the member 88 will have its lower end rest upon a block 98 and will prevent downward movement of part 88. When the latch 96 is disengaged with the top surface of the block 98, on the other hand, the latch and the tubular member 88 may move downwardly. The block 98 also serves to interconnect the tubular members 88 and 90 for simultaneous rotation being carried by the latter and extending through an elongated slot 99 in member 88. The tubular member 90 carries a pulley 101 which is operatively connected to a variable speed series or universal type electric motor 100 by means of a flexible V-belt 102.

Blood introduced into the receptacle 78 through the riser 76 will flow, during rotation of the receptacle at a proper speed, outwardly along the inner surface of the top wall 78' of the receptacle and due to centrifugal action will be caused to stratify as it collects in the flared side wall portion 78'' so as to form, as indicated at 104, an outer layer of red corpuscles, a second buffer layer 106 adjacent thereto, which may comprise red and white corpuscles and blood plasma. Inwardly of this layer, a third layer 108 of plasma will form. It will be appreciated that as the receptacle 78 continues to receive the conditioned whole blood these sections will increase radially inwardly and when sufficient material has been introduced the innermost layer consisting substantially entirely of blood plasma will reach such a thickness or depth as to overflow at the open lower end 78''' of the receptacle 78 so that it may gravitate downwardly and out of the receptacle. A surrounding upstanding wall 110 is carried upon a main plate 111 so as to form in effect a pan for receiving the material. The material so collecting in the pan will, when the valve is in its first operative position, pass through a port 112 in the valve casing, through a valve passage 113 to conduit 116 connected to a plasma receptacle A (see diagrammatic Fig. 15). At the same time a source of fluid pressure will be set up in receptacle D by the valve and pressure means to be later described.

The centrifugal receptacle 78 is of such special size and shape that when one standard unit or donation of blood from a person, for example approximately 500 cc., may be completely processed by the receptacle, the red and white corpuscles thereof and constituting the outermost layer 104 and the buffer layer 106 nearly filling the volume of the receptacle outwardly of the neck portion 78'''. In this manner a great deal of the plasma will be caused to flow outwardly through the neck of the receptacle into container A. The valve casing 74 is carried by the supporting plate 111 and also carried by this plate are preferably four circular spacer members 119 carrying closure members 121 to which four containers or bags of suitable construction may be securely attached, as by screw threaded connections or other suitable means. The containers are designated by the characters B, C, D and A, the last having already been referred to above. The reason for the spacers 119 is to allow ample room for the conduits passing through the cover members 121 and to accommodate suitable vent means for certain or all of the containers.

In the treatment of blood the receptacle D will contain a sterilized small measured amount of wash solution such as an aqueous saline solution and will be connected by a conduit 117 and valve 72 to pressure means, to be presently described, in such a manner that this solution may be forced upwardly through a tube 124 and into the chambers 18 and 20 when the needle 24 on the flexible tube 22 is caused to pierce a sealed port 126 on the top of tube 124. This will force out the small amount of blood which would otherwise be left in the needle, in the chambers 18 and 20 and in the tubes 22 and 40 and will cause same to flow up through riser 76 and into the receptacle 78. (See Fig. 16.)

The pressure means for effecting action of the saline solution may constitute a container 130 (see Fig. 1) providing a high pressure source of purified nitrogen, suitable connecting means 136, a manual control valve 138, and a high pressure regulating valve 140 which is in turn connected to a low pressure regulating valve 140', in turn connected to a port of the valve 72.

Figures 3, 4, 15, 16, 17, 18:
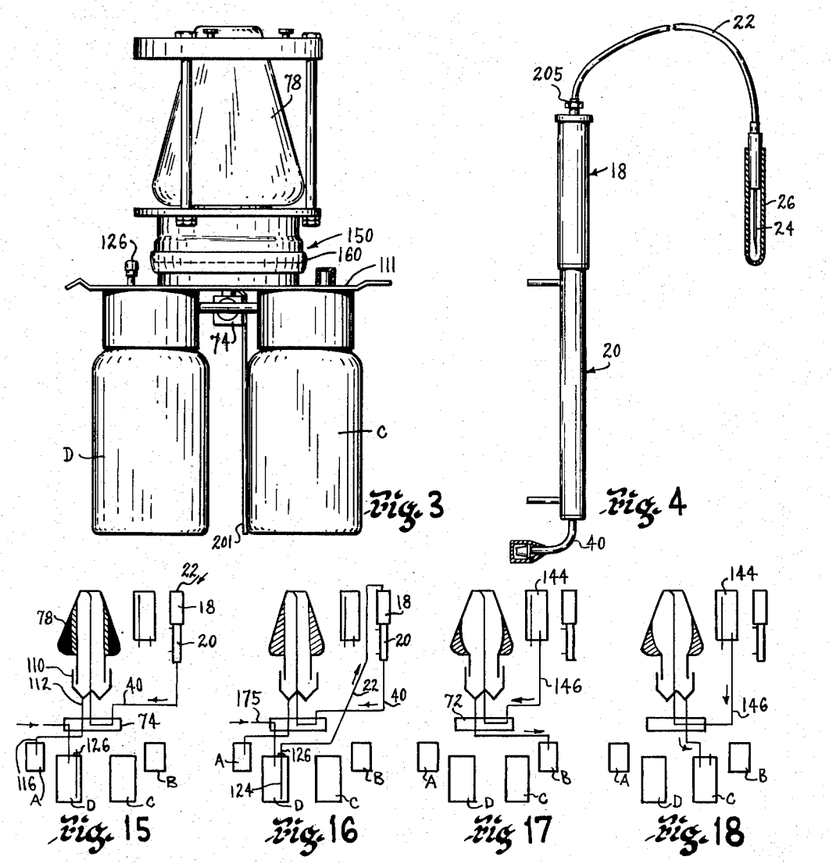
Fig. 3 is a somewhat enlarged view of the separable hermetically sealed unit or sub-assembly which is useable in the apparatus of Fig. 1.
Fig. 4 is an elevational view of a separable conditioning unit which may be employed in the apparatus of Fig. 1.
Figs. 15–20 inclusive, are diagrammatic sketches indicating different operative conditions of the apparatus.

The initial plasma separation is diagrammatically indicated in Figs. 15 and 16 and is effected by the centrifugal force produced by the rotation of the receptacle 78 of approximately 200 times gravity. The additional plasma separation indicated by Fig. 16 is likewise accomplished at this centrifugal pressure, after which a secondary plasma separation may be accomplished by introducing in the receptacle 78 from an auxiliary receptacle 144 a saline wash solution. This may be brought about by a conduit (not shown in Fig. 1) but schematically indicated at 146 in Fig. 17 and connected through valve 72 to the riser 76. This will wash out the buffer solution containing plasma and cells so that same may be collected in receptacle B. This washing action it should be noted is carried on at a lesser rotational speed of the receptacle 78, preferably at a pressure of about 50 times gravity.

Figure 19:
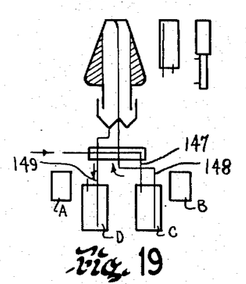
Figure 20:
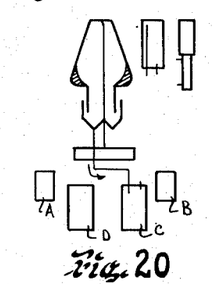

Then, as indicated by Fig. 18, a wash (a saline solution) is introduced into the receptacle 78 from the container 144 and the red cells, which remain in receptacle 78 and which are noticeably compacted, are loosened and washed out of the receptacle and into the container C while reducing the speed of the receptacle from approximately 50 to one times gravity. The cells in solution in container C may thereafter be returned to receptacle 78 by applying to the container C nitrogen under pressure and introduced through valve 72 as indicated in Fig. 19. At such time the greater part of the wash solution may be removed from the cells and drained into container D while rotating receptacle 78 at approximately 200 g. A mixture of the desired concentration may thus be obtained, after which the speed may be again reduced to approximately 1 g. and the washed cells and solution drained into container C, as indicated by Fig. 20.

In order to increase the utility of the apparatus, the receptacle 78, supporting structure therefor, the control valve 72, all conduits, and the four containers A, B, C and D are mounted upon a readily removable sub-assembly 150 shown to advantage in Fig. 3. This sub-assembly is supported by plate 111 and has edge portions thereof extended so as to rest upon side rails 152 carried by the main frame 14 (see Fig. 2). Suitable clamping or retaining means is indicated at 154. Such a sub-assembly may be completely sterilized and all openings therein hermetically sealed by a pharmaceutical house before shipment thereof to the user of the apparatus. At such time the receptacle 78 will be nested with the pan portion 110 on the plate 111, and an outer baffle means 156 and 158 carried by the cradle 80 and the plate 111 respectively, will be sealed by suitable means as indicated at 160 in Fig. 3. If desired the baffles 156 and 158 may be provided with screw threaded or bayonet connections to hold them securely during shipment and adapted for disengagement during coupling operation between parts 80' and 82. Also a flexible silicone seal 162 (see Fig. 9) carried by lower cradle plate 80'' will fit snugly between an outer baffle plate 164 and plate 110, when the receptacle 78 is in a lowered position and sealed for shipment as in Fig. 3, so as to enclose a sealing fluid 166, (see Fig. 9). A secondary circular plate 168 caried by plate 80'' extends down into this sealing fluid and assures a hermetical seal even after the outer seal 160 is broken for allowing elevation of the receptacle 78 and during subsequent rotation thereof.

When the sub-assembly is placed in the apparatus for use, a stem portion 170 of the valve (see Fig. 8) will be splined or otherwise readily connected to the shaft of a valve actuating motor 172.

Simultaneous to a splining of the stem portion 170 of the valve to the shaft of the motor 172, suitable couplings will be made to the water connections 173 and 174 and nitrogen connection 175 with the constructions thereof being similar to the coupling illustrated in Fig. 6. It is to be noted that the nitrogen line is provided intermediate the coupling 174 and its connection with the valve housing 74 with a suitable bacteriological filter 176.

Figure 21:
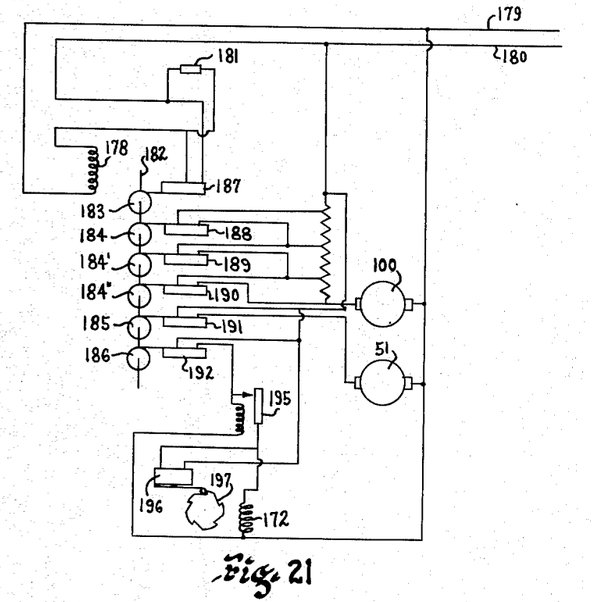
Fig. 21 is a diagrammatic showing of electrical system which may be employed to the apparatus of Fig. 1.

The entire process set forth above is controlled by a suitable timing mechanism enclosed in a suitable housing 177 (Fig. 1), and diagrammatically illustrated in Fig. 21. It is particularly pointed out that a timing motor 178 is connected to a suitable source of power through the lead wires 179 and 180. In the lead wire 180, there is incorporated a manual starting switch 181 by which the motor may be energized. There is provided a driven cam shaft 182 carrying a plurality of cam members 183, 184, 184', 184'', 185 and 186, in spaced longitudinal relation with each other. Cam 183 is arranged with suitable switch means 187 for self energizing the timing motor 178 subsequent to the initial manual energizing of said motor 178. This imparts a continuous rotary movement to the shaft 182 wherein the various associated switches 188, 189, 190, 191 and 192 are caused to move into operative or inoperative position, as desired. The switches 188, 189 and 190 are used for controlling the speed of the centrifuge motor 100 by which the rotary movement is imparted to the centrifuge 78 through the belt and pulley drive connection 194. Switch 191 is provided to control the function of the centrifugal pump driving motor 51. Switch 192 and its associated cam 186 provide timed pulses for operation of valve operating motor 172 for determining the operative cycle of the valve. Associated with switch 192 and in the circuit between it and motor 172 is provided a thermal switch 195, the purpose of the switch being to interrupt the flow of current to motor 172 which was initiated by switch 192 before switch 196 associated with the valve cam 197 operates to open circuit switch 196. This is necessary because of the relative speeds of cam 186 which is slow and cam 197 which is relatively fast in order to bring about the desired quick shift of the position of the valve without losing processing time. The cam 197 is mounted on the shaft of motor 172 and operates the switch through a suitable spring finger 198 which, in turn, yieldably exerts and relieves pressure on the operating button 199 of the switch 196 (see Fig. 14).

This timing arrangement is intended to enable the automatic completion of the various processing cycles set forth above and will operate the valve in accordance with said cycles so as to enable the plasma, red and white corpuscles, and remaining plasma, intermixed saline solutions and washing solutions to be properly deposited in their respective receptacles in accordance with the processing set forth above.

Figures 12, 13, 14:
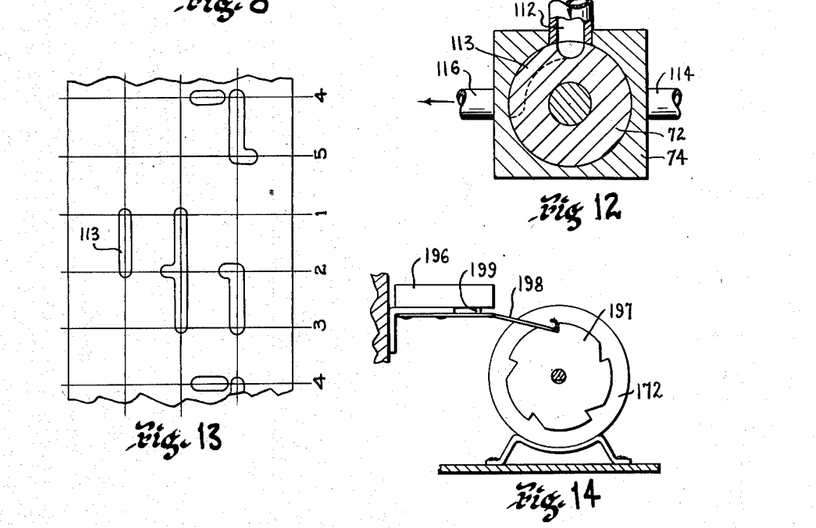
Fig. 12 is a sectional view taken upon section line 12—12 of Fig. 8.
Fig. 13 is a development of the periphery of the valve structure shown in Fig. 12.
Fig. 14 is a sectional view taken substantially on section line 14—14 of Fig. 8 and looking in the direction of the arrows.

It is to be noted that the function of the valve, as set forth throughout the various Figs. 15 through 20 inclusive, is made possible through the provisions of suitable grooves 113 which are engraved upon the surface of the valve, as illustrated at Fig. 13 and which are so located and dimensionally controlled as to provide the proper communication between the collecting bowl formed by upstanding member 110 and the plate 111 and the conductors leading to the respective receptacles A, B, C and D which respective communications are dependent upon the extent of rotary movement imparted to the valve at the completion of each of the successive steps of the cycle of the processing of the blood.

Referring to Fig. 2, in order to prevent contamination of collected products by misdirection of fluid through the upstanding member 76 and which fail to follow the inner upper surface 78' and thereby respond to gravity tending to cause them to fall instead of following said surface, there is provided a suitable receiving flared end tube 200 which is, in turn, connected with an outlet 201 which deposits said unwanted material into a suitable receptacle or pan 202. This, therefore, insures that only the desired portion of the blood which follows the inner surface of the upper end 78 of the centrifugal bowl will be processed.

Figure 7:
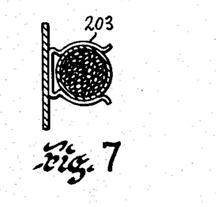
Fig. 7 is a sectional view taken substantially upon line 7—7 of Fig. 1.

While it has been described that the sub-assembly embodying the various receptacles A, B, C and D and associated parts are interchangeable, it is pointed out that the resin exchange and heat exchanging columns are also removable and interchangeable and may be quickly and easily disassembled for cleansing and sterilization. This is due to the fact that the said columns are supported by suitable spring clamp means 203 and 204 (see Figs. 1 and 7), whereby they may be quickly clamped into desired supporting position. Simultaneous to the engagement of the spring clamps 203 and 204, the water inlet and outlet 37 and 39 are coupled with the lines 54 and 62 respectively through the use of suitable coupling means 42 and 60 such as shown in Fig. 6. The stem 41 is readily coupled with the tube 40 as is also true of the tube 22 with the upper end of the column 18 of the resin unit by means of the coupling 205.

Referring again to Fig. 1, the nitrogen system is provided with suitable pressure indicators 206 and 207, the indicator 206 being for the purpose of indicating the tank pressure and the indicator 207, the intermediate line pressure.

Referring to Fig. 2 and in order to maintain the liquid deposited in the respective receptacles A, B, C and D at a desired low temperature, there is provided a cooling system in each of said receptacles which each embody an outer sealed housing 208 carried by the receptacle cover 121 having an inner tubular member 209 of less diameter extending longitudinally thereof with its lower end slightly spaced from the lower end of the housing whereby ice water or other suitable cooling liquid may be directed inwardly through said inner tubular members so as to flow outwardly of the lower end thereof and thence through a suitable outlet 210 provided in the outer upper end of each housing 208. It is to be understood that the said cooling units are in series with each other and are coupled with the cooling system which flows through the heat exchange column 20 to a suitable source of origin, not shown. It is further to be understood that a suitable pumping system is provided for circulating the coolant which may be of any conventional type.

The centrifuge bowl 78 is provided intermediate the lower end thereof and the plate 80'' and the upper end thereof and the plate 80' with suitable resilient liners 218 and 219 function as cushioning means for said bowl.

Figure 22:
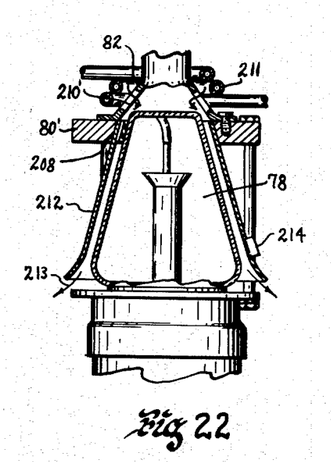
Fig. 22 is a modified construction employing additional cooling means which may be employed with the structure of Fig. 1.
Figure 23:
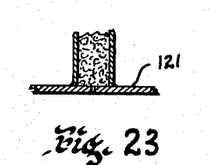
Fig. 23 is a sectional view of a bacteriological filter and vent for containers of the apparatus.

As shown in Fig. 22, an external cooling system may be provided for the centrifuge bowl 78 by forming suitable openings 210' in the member 82 and by surrounding the member 82 with a cooling coil 211. Beneath the member 82 and positioned in overlying spaced relation with the bowl 78, there is provided a cone-shaped shroud 212 carried by the plate 80' intermediate the cushioning means 218 and said plate. In this instance, the cushioning means 218 is formed so as to provide spaced sections whereby the area between said sections is open to permit air to circulate from the cooling coils through openings 210' and downwardly between the shroud 212 and the outer surface of the bowl 78, as indicated by the arrow 213. The air will be drawn downwardly by the centrifugal action and may be enhanced by perforating and forming outwardly flared fins 214 in the shroud adjacent the lower end thereof.

Even though the apparatus has been described at considerable length in connection with the processing of blood, it must be kept in mind that other body solutions, fluids, mixtures, etc., which have different specific gravities for the various component parts thereof may in a similar manner be conditioned, cooled, separated, collected and reprocessed by the above described apparatus as desired and while being kept under completely sterile, and if desired, cooled condition; it is only necessary for satisfactory results to vary the temperatures, the timing of the operating cycle, the speeds of rotation of the centrifuge and the like, to work with a valve of proper construction to accommodate the particular process selected.

Having thus described my invention, I claim:

1. A fluid separating and storing apparatus comprising a vertically disposed flared receptacle having an open lower end, a plurality of closed containers for receiving component parts of a fluid being processed by said apparatus, a multiple-position valve, conduits interconnecting said containers and said valve, a fluid-receiving conduit connected to said valve, a hollow riser connected to said valve and extending vertically into said flared receptacle, a fluid collecting pan communicating with said valve and disposed beneath said flared receptacle and having side wall portions thereof and sealing means closing the open end of said receptacle, means for rotating said flared receptacle about its vertically disposed axis at speeds sufficient to cause a stratification of the components contained by said fluid within said receptacle, said valve being constructed and arranged with passages for interconnecting said conduits, said pan and said riser in different predetermined arrangements, and adjustable to different predetermined positions for directing different components of said fluid into preselected containers, the receptacle being readily rotatable relative to the remainder of the apparatus while maintaining said closed condition.

2. A fluid separating and storing apparatus comprising a vertically disposed flared receptacle having an open lower end, a plurality of closed containers for receiving component parts of a fluid being processed by said apparatus, a multiple-position valve, conduits interconnecting said containers and said valve, a fluid-receiving conduit connected to said valve, a hollow riser connected to said valve and extending vertically into said flared receptacle, a fluid collecting pan communicating with said valve and disposed beneath said flared receptacle and having side wall portions thereof and sealing means closing the open end of said receptacle, means for rotating said flared receptacle about its vertically disposed axis at speeds sufficient to cause a stratification of the components contained by said fluid within said receptacle, said valve being constructed and arranged with passages for interconnecting said conduits, said pan and said riser in different predetermined arrangements, and adjustable to different predetermined positions for directing different components of said fluid into preselected containers, said receptacle, valve and containers being substantially completely closed to thereby prevent the infiltration of ambient air during rotation of said receptacle and being readily separable from said rotating means while maintaining said closed condition.

3. A fluid separating and storing apparatus comprising a vertically disposed flared receptacle having a lower open end, means for closing the lower end of said receptacle to the infiltration of ambient air, means for rotating said flared receptacle about its vertically disposed axis while so closed, means for directing a fluid having different components internally of said receptacle and to the inner side wall thereof so as to respond to the rotary motion of the receptacle, whereby at least one of said components of the fluid has the major portion thereof isolated from said other components thereof, means for supporting a plurality of containers and valve means adjacent said flared receptacle, a plurality of passage ways, one leading to each of said receptacles and communicating with said valve means, and which valve means in turn communicates with the lower end of the receptacle for receiving the isolated component of the fluid and for directing it to one of said containers at one position of adjustment of the valve, said valve being adjustable to any one of a plurality of positions for permitting selective communication of the lower end of the container with other of said containers through said passage ways, said receptacle, valve and containers being substantially completely closed to ambient air while being in communicating relation with each other to thereby prevent the infiltration of said air, and the receptacle being readily rotatable relative to the remainder of the apparatus while maintaining said closed condition.

4. The combination of a vertically disposed rotatable flared receptacle having an open lower end portion, a plurality of containers, means including a pan for closing the lower end of said receptacle while allowing rotation of said receptacle about its vertically disposed axis, valve means for controlling communication with said receptacle, a passage way leading to each of said containers and communicating with said valve means, means for connecting said valve means with said lower end of the receptacle, means for receiving and directing a fluid through said pan and internally of said receptacle, said last mentioned means embodying a filtering unit through which said fluid initially flows and a cooling unit for receiving said fluid from said filtering unit prior to its being directed to said receptacle, said flared receptacle, passage ways, filter and cooling units all being in sealed in communicating relation through said valve means with each other to thereby prevent the infiltration of ambient air, whereby the valve means may be adjusted during rotation of said receptacle for directing selective components of the fluid in said flared receptacle to respective containers without danger of contamination.

5. The combination of a vertically disposed rotatable flared receptacle having an open lower end portion, a plurality of containers, means including a pan for closing the lower end of said receptacle while allowing rotation of said receptacle about its vertically disposed axis, valve means for controlling communication with said receptacle, a passage way leading to each of said containers and communicating with said valve means, means for connecting said valve means with said lower end of the receptacle, means for receiving and directing a fluid through said pan and internally of said receptacle, said last mentioned means embodying a filtering unit through which said fluid initially flows and a cooling unit for receiving said fluid from said filtering unit prior to its being directed to said receptacle, said cooling unit having a coolant passageway for conducting a cooling fluid therethrough, said flared receptacle, passage ways, valve means, filter and cooling units all being in sealed in communicating relation through said valve means with each other to thereby prevent the infiltration of ambient air, whereby the valve means may be adjusted during rotation of said receptacle for directing selective components of the fluid in said flared receptacle to respective containers without danger of contamination, certain of said containers embodying cooling means, and means connecting said last mentioned cooling means and the coolant passageway of said cooling unit to a source of cooling fluid.

6. The combination of a vertically disposed rotatable flared receptacle having an open lower end portion, a plurality of containers, means including a pan for closing the lower end of said receptacle while allowing rotation of said receptacle about its vertically disposed axis, valve means for controlling communication with said receptacle, a passage way leading to each of said containers and communicating with said valve means, means for connecting said valve means with said lower end of the receptacle, means for receiving and directing a fluid through said pan and internally of said receptacle, said last mentioned means embodying a filtering unit through which said fluid initially flows and a cooling unit for receiving said fluid from said filtering unit prior to its being directed to said receptacle, said cooling unit having a coolant passageway for conducting a cooling fluid therethrough, said flared receptacle, passage ways, filter and cooling units all being in sealed in communicating relation through said valve means with each other to thereby prevent the infiltration of ambient air, whereby the valve means may be adjusted during rotation of said receptacle for directing selective components of the fluid in said flared receptacle to respective containers without danger of contamination, certain of said containers embodying cooling means, means connecting said last mentioned cooling means and the coolant passageway of said cooling unit to a source of cooling fluid, and said cooling means and cooling unit being connected in series with a coolant circulating means.

7. The combination of a vertically disposed rotatable flared receptacle having an open lower end portion, a plurality of containers, means including a pan for closing the lower end of said receptacle while allowing rotation of said receptacle about its vertically disposed axis, valve means for controlling communication with said receptacle, a passage way leading to each of said containers and communicating with said valve means, means for connecting said valve means with said lower end of the receptacle, means for receiving and directing a fluid through said pan and internally of said receptacle, said last mentioned means embodying a filtering unit through which said fluid initially flows and a cooling unit for receiving said fluid from said filtering unit prior to its being directed to said receptacle, said cooling unit having a coolant passageway for conducting a cooling fluid therethrough, said flared receptacle, passage ways, filter and cooling units all being in sealed in communicating relation through said valve means with each other to thereby prevent the infiltration of ambient air, whereby the valve means may be adjusted during rotation of said receptacle for directing selective components of the fluid in said flared receptacle to respective containers without danger of contamination, certain of said containers embodying cooling means, means connecting said last mentioned cooling means and the coolant passageway of said cooling unit to a source of cooling fluid, said cooling means and cooling unit being connected to circulating means, and means for automatically controlling the speed and duration of rotation of the flared receptacle and the positions of said valve means before and during rotation of said receptacle to effect a predetermined operating cycle thereof.

8. The combination of a vertically disposed rotatable flared receptacle having an open lower end portion, a plurality of containers, means including a pan for closing the lower end of said receptacle while allowing rotation of said receptacle about its vertically disposed axis, valve means for controlling communication with said receptacle, a passage way leading to each of said containers and communicating with said valve means, means for connecting said valve means with said lower end of the receptacle, means for receiving and directing a fluid through said pan and internally of said receptacle, said last mentioned means embodying a filtering unit through which said fluid initially flows and a cooling unit for receiving said fluid from said filtering unit, prior to its being directed to said receptacle, said cooling unit having a coolant passageway for conducting a cooling fluid therethrough, said flared receptacle, passage ways, filter and cooling units all being in sealed in communicating relation through said valve means with each other to thereby prevent the infiltration of ambient air, whereby the valve means may be adjusted during rotation of said receptacle for directing selective components of the fluid in said flared receptacle to respective containers without danger of contamination, certain of said containers embodying cooling means, means connecting said last mentioned cooling means and the coolant passageway of said cooling unit to a source of cooling fluid, said cooling means and cooling unit being connected to circulating means, means for automatically controlling the speed and duration of rotation of the flared receptacle and the positions of said valve means before and during rotation of said receptacle to effect a predetermined operating cycle thereof, said valve means embodying a cylinder and a core rotatable internally of said cylinder, said cylinder having outlets communicating with the flared receptacle and having outlets communicating with the respective containers, and said rotatable core having channeled portions which at different selected positions of said core will interconnect the passage way for said flared receptacle with the passage way for selected containers.

9. The combination of a vertically disposed rotatable flared receptacle having an open lower end portion, a plurality of containers, means including a pan for closing the lower end of said receptacle while allowing rotation of said receptacle about its vertically disposed axis, valve means for controlling communication with said receptacle, a passage way leading to each of said containers and communicating with said valve means, means for connecting said valve means with said lower end of the receptacle, means for receiving and directing a fluid through said pan and internally of said receptacle, said cooling unit having a coolant passageway for conducting a cooling fluid therethrough, said last mentioned means embodying a filtering unit through which said fluid initially flows and a cooling unit for receiving said fluid from said filtering unit prior to its being directed to said receptacle, said flared receptacle, passage ways, filter and cooling units all being in sealed in communicating relation through said valve means with each other to thereby present the infiltration of ambient air, whereby the valve means may be adjusted during rotation of said receptacle for directing selective components of the fluid in said flared receptacle to respective containers without danger of contamination, certain of said containers embodying cooling means, means connecting said last mentioned cooling means and the coolant passageway of said cooling unit to a source of cooling fluid, said cooling means and cooling unit being connected to circulating means, means for automatically controlling the speed and duration of rotation of the flared receptacle and the positions of said valve means before and during rotation of said receptacle to effect a predetermined operating cycle thereof, said valve means embodying a cylinder and a core rotatable internally of said cylinder, said cylinder having outlets communicating with the flared receptacle and having outlets communicating with the respective containers, said rotatable core having channeled portions which at different selected positions of said core will interconnect the passage way for said flared receptacle with the passage ways for selected containers, and a pressure system connected to said valve means and having means communicating with selected containers for introducing an internal pressure in the selected container when said valve is positioned to connect the selected container with the flared receptacle for causing the fluid therein to return to said flared receptacle.

10. For use in fluid separating apparatus having a vertically disposed rotatable spindle and motor means for operating same, the combination of a removable sub-assembly comprising a carrying plate, an inverted flared receptacle carried thereby and disposed above said plate, a plurality of containers and a multiple positioned valve carried by said plate and below said receptacle, means effecting inter-communication between each of said containers and said valve means, and between said valve means and said flared receptacle, means for hermetically sealing said flared receptacle to said inter-communicating means, said flared receptacle being movable away from said plate when said sub-assembly is positioned in said apparatus and connected to said rotatable means for rotation therewith without the sealing action of said sealing means being broken.

11. For use in fluid separating apparatus having a vertically disposed rotatable spindle and motor means for operating same, the combination of a removable sub-assembly comprising a carrying plate, an inverted flared receptacle carried thereby and disposed above said plate a plurality of containers and a multiple positioned valve carried by said plate and below said receptacle, means effecting inter-communication between each of said containers and said valve means, and between said valve means and said flared receptacle, means for hermetically sealing said flared receptacle to said inter-communicating means, said flared receptacle being movable away from said plate when said sub-assembly is positioned in said apparatus and connected to said rotatable means for rotation therewith without the sealing action of said sealing means being broken, and said inter-communicating means effecting a complete seal, preventing infiltration of air into said receptacle, said containers or said valve means while said receptacle is being carried by or raised from said plate.

12. A fluid separating and storing apparatus comprising a vertically disposed flared receptacle having an open lower end, a plurality of closed containers for receiving component parts of a fluid being processed by said apparatus, a multiple-position valve, conduits interconnecting said containers and said valve, a hollow riser extending vertically into said flared receptacle, a fluid collecting pan having side walls and a passageway disposed beneath said flared receptacle, and having a passageway communicating with said valve, means for effecting a hermetical seal between the side walls of said pan and said flared receptacle while allowing relative rotational movement therebetween, means for rotating said flared receptacle about its vertically disposed axis at speeds sufficient to cause stratification of certain of the components contained by said fluid within said receptacle, said valve being adjustable to different predetermined positions for directing different components of said fluid received from said receptacle into preselected containers, and means for automatically controlling the speed and duration of rotation of said flared receptacle and simultaneously the position of said valve means during an operating cycle of the apparatus to effect a collection of desired fluid components in separate containers.

13. A fluid separating and storing apparatus comprising a vertically disposed flared receptacle having an open lower end, a plurality of closed containers for receiving component parts of a fluid being processed by said apparatus, a multiple-position valve, conduits interconnecting said containers and said valve, a hollow riser extending vertically into said flared receptacle, a fluid collecting pan having side walls and a passageway disposed beneath said flared receptacle, and having a passageway communicating with said valve, means for effecting a hermetical seal between the side walls of said pan and said flared receptacle while allowing relative rotational movement therebetween, means for rotating said flared receptacle about its vertically disposed axis at speeds sufficient to cause stratification of certain of the components contained by said fluid within said receptacle, said valve being adjustable to different predetermined positions for directing different components of said fluid received from said receptacle into preselected containers, means for automatically controlling the speed and duration of rotation of said flared receptacle and simultaneously the position of said valve means during an operating cycle of the apparatus to effect a collection of desired fluid components in separate containers, and a pressure system connected to said valve means and having means communicating with selected containers for introducing an internal gaseous pressure in the selected containers when said valve means is positioned to connect the selected container with the flared receptacle causing the fluid therein to return to said flared receptacle.

14. A fluid separating and storing apparatus comprising a vertically disposed flared receptacle having an open lower end, a plurality of closed containers for receiving component parts of a fluid being processed by said apparatus, a multiple-position valve, conduits interconnecting said containers and said valve, a hollow riser extending vertically into said flared receptacle, a fluid collecting pan having side walls and a passageway disposed beneath said flared receptacle, and having a passageway communicating with said valve, means for effecting a hermetical seal between the side walls of said pan and said flared receptacle while allowing relative rotational movement therebetween, means for rotating said flared receptacle about its vertically disposed axis at speeds sufficient to cause stratification of certain of the components contained by said fluid within said receptacle, said valve being adjustable to different predetermined positions for directing different components of said fluid received from said receptacle into preselected containers, and means for automatically controlling the speed and duration of rotation of said flared receptacle and simultaneously the position of said valve means during an operating cycle of the apparatus to effect a collection of desired fluid components in separate containers, said receptacle, said valve and said containers being carried upon a plate in said apparatus and readily removable with said plate from the remainder of said apparatus as a unit without allowing ambient air to enter said containers, valve or receptacle.

References Cited in the file of this patent

UNITED STATES PATENTS

| Number | Name | Date |
|---|---|---|
| 1,621,475 | Cross | Mar. 15, 1927 |
| 2,343,694 | Mitchum | Mar. 7, 1944 |
| 2,365,256 | Edvarsson | Dec. 19, 1944 |
| 2,461,674 | Aronson | Feb. 15, 1949 |